(12) United States Patent
Zeng

(10) Patent No.: US 8,686,762 B2
(45) Date of Patent: Apr. 1, 2014

(54) HALF OPEN-LOOP-CONTROLLED LIN TRANSMITTER

(75) Inventor: Ni Zeng, Shenzhen (CN)

(73) Assignee: STMicroelectronics (Shenzhen) R&D Co. Ltd., Shenzhen (CN)

( * ) Notice: Subject to any disclaimer, the term of this patent is extended or adjusted under 35 U.S.C. 154(b) by 23 days.

(21) Appl. No.: 13/483,796

(22) Filed: May 30, 2012

(65) Prior Publication Data

US 2013/0003888 A1    Jan. 3, 2013

(30) Foreign Application Priority Data

Jun. 30, 2011 (CN) ........................... 2011 1 0189869
Dec. 31, 2011 (CN) ........................... 2011 1 0461923
Dec. 31, 2011 (CN) ...................... 2011 2 0578256 U

(51) Int. Cl.
*H03B 1/00* (2006.01)
*H03K 3/00* (2006.01)

(52) U.S. Cl.
USPC ........... 327/108; 327/109; 327/110; 327/111; 327/112; 327/170

(58) Field of Classification Search
USPC ................................................ 327/108–111
See application file for complete search history.

(56) References Cited

U.S. PATENT DOCUMENTS

| | | | |
|---|---|---|---|
| 8,143,912 B2 * | 3/2012 | Hsiao et al. | 326/30 |
| 8,208,280 B2 * | 6/2012 | Shin et al. | 365/96 |
| 2009/0262567 A1 * | 10/2009 | Shin et al. | 365/96 |
| 2010/0134186 A1 * | 6/2010 | Chung | 330/253 |
| 2010/0176883 A1 * | 7/2010 | Mangudi et al. | 330/253 |
| 2010/0277142 A1 * | 11/2010 | Tan et al. | 323/268 |
| 2011/0148467 A1 * | 6/2011 | Le Guillou | 327/2 |
| 2013/0003805 A1 * | 1/2013 | Zeng et al. | 375/224 |
| 2013/0003888 A1 * | 1/2013 | Zeng | 375/295 |
| 2013/0009689 A1 * | 1/2013 | Santos | 327/394 |
| 2013/0043957 A1 * | 2/2013 | Shibata | 331/108 R |
| 2013/0069720 A1 * | 3/2013 | Reisiger | 330/253 |

* cited by examiner

*Primary Examiner* — Adam Houston
(74) *Attorney, Agent, or Firm* — Hogan Lovells US LLP

(57) ABSTRACT

An LIN transmitter includes a current mirror coupled to a transmit output node and a control circuit coupled to a transmit input node for controlling the current mirror with various load current control signals.

19 Claims, 3 Drawing Sheets

HALF OPEN-LOOP-CONTROLLED LIN TRANSMITTER

RELATED CASE INFORMATION

This application is a translation of and claims the priority benefit of Chinese patent application number 201110189869.1, filed on Jun. 30, 2011, Chinese patent application number 201110461923.3, filed on Dec. 31, 2011, and Chinese patent application number 201120578256.2, filed on Dec. 31, 2011, which are hereby incorporated by reference to the maximum extent allowable by law.

FIELD OF THE INVENTION

The present invention relates to transmitters, and, more particularly, to LIN (Local Interconnect Network) transmitters.

BACKGROUND OF THE INVENTION

In the prior art, there are three traditional structures for a LIN transmitter: closed-loop-controlled transmitter; open-loop-controlled transmitter; and DAC (Digital-to-Analog Converter)-controlled transmitter.

Generally speaking, the prior art closed-loop-controlled transmitter shows good EMI (ElectroMagnetic Interference) characteristics but poor immunity to RF (Radio Frequencies). The closed-loop-controlled transmitter uses feedback in its design. As a rule, however, the use of feedback has become forbidden in later designs of LIN transmitters, because the use of feedback may cause unexpected operation.

The open-loop-controlled transmitter has better immunity to RF than the close-loop-controlled transmitter, but worse EMI characteristics.

DAC-controlled transmitters are a variation of an open-loop transmitter. The DAC-controlled structure can theoretically be made acceptable for both RF and EMI performance. However, in practice, circuit complexity becomes an issue and a practical realization of the DAC-controlled transmitter fails to measurably improve performance.

What is desired, therefore, is a relatively simple LIN transmitter design that shows real improvement in RF and EMI performance, as well as good immunity to ISO2 and ISO3a pulses (See the ISO 7637 standard for the definition of these pulses). This immunity is not present in the prior art.

SUMMARY OF THE INVENTION

According to the present invention, a "half open-loop-controlled" LIN transmitter provides a relatively simple LIN transmitter design having improved RF and EMI performance characteristics, as well as good immunity to ISO2 and ISO3a pulses.

The LIN transmitter of the present invention comprises a current mirror including a plurality of input transistors for generating a first plurality of control signals and an output transistor coupled to a transmitter output node, a first plurality of current sources coupled to the plurality of input transistors; a second plurality of current sources; a third plurality of current sources; a control circuit for receiving the first plurality of control signals and for generating a second plurality of control signals and a third plurality of control signals; a first switching circuit coupled to the second plurality of current sources for receiving the second plurality of control signals; and a second switching circuit coupled to the third plurality of current sources for receiving the third plurality of control signals. The first plurality of control signals comprises first, second, and third load current threshold control signals, as well as a current mirror voltage threshold control signal. The second plurality of control signals comprises a fast charge control signal and a start current limit control signal. The third plurality of control signals comprises a fast discharge control signal and a hard switchoff control signal. The control circuit receives a transmit data input signal and an enable signal.

DETAILED DESCRIPTION

Figure 1:
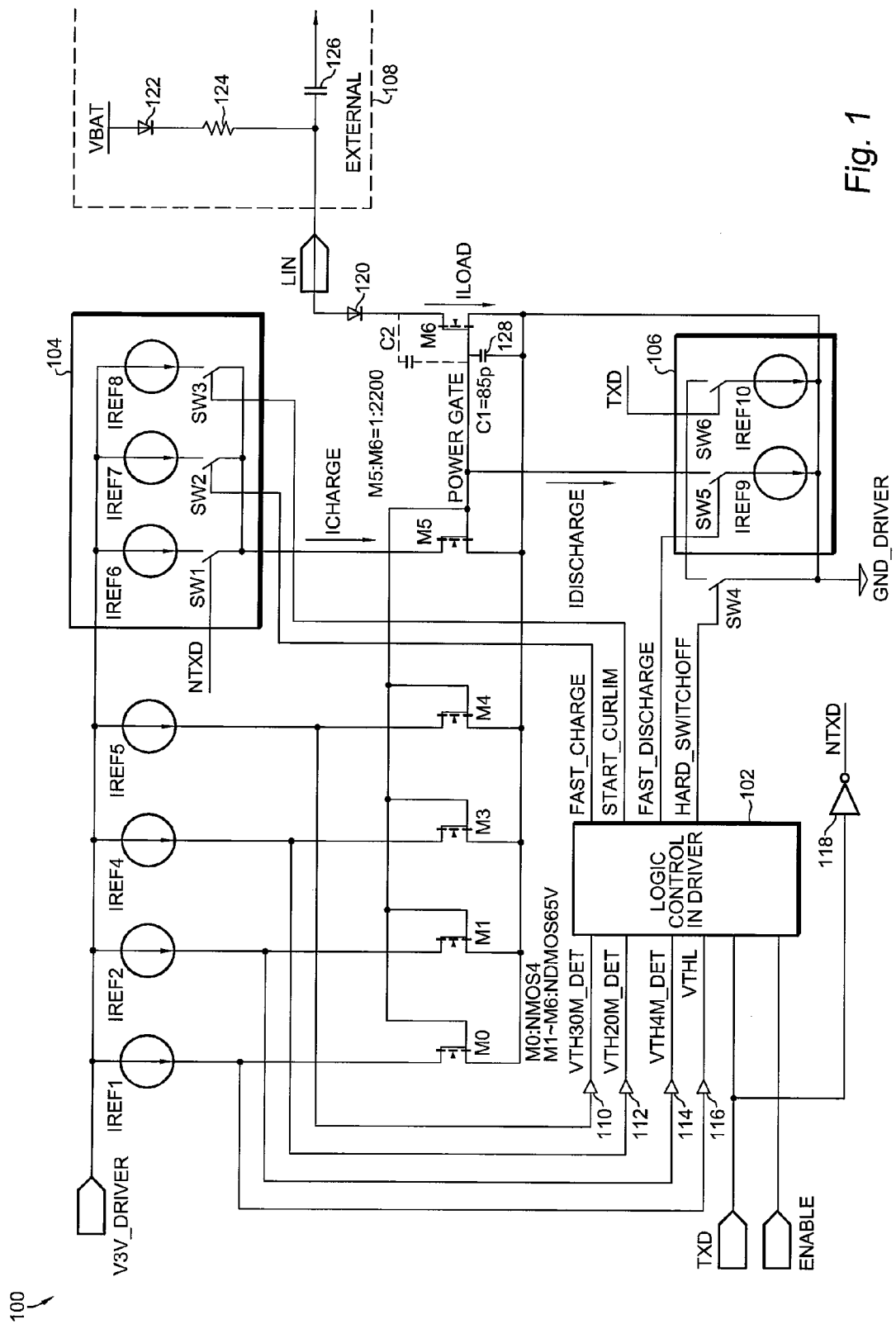
FIG. 1 is a schematic of an LIN transmitter according to the present invention.
Figure 2:
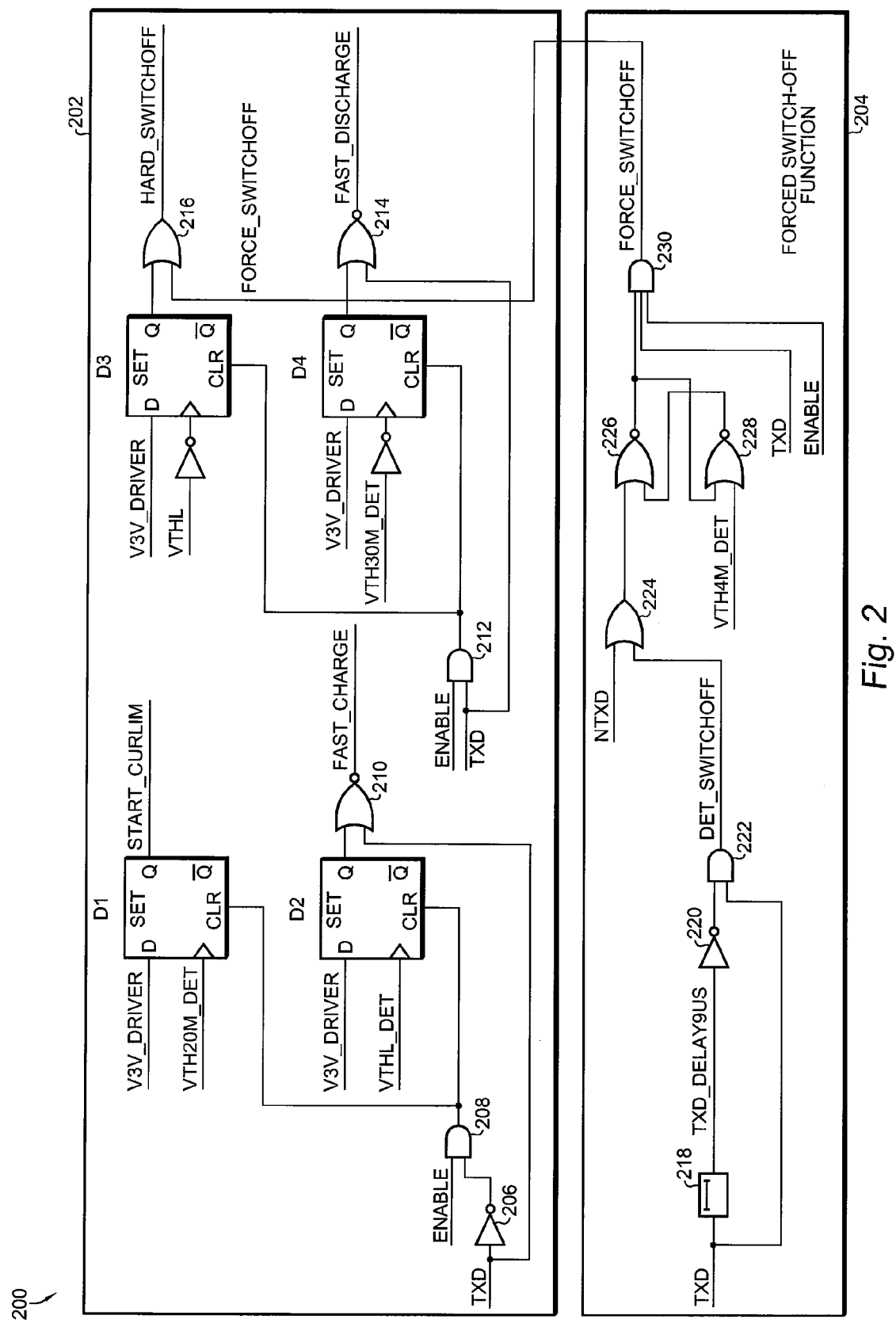
FIG. 2 is a schematic diagram of a logic control circuit associated with the LIN transmitter of FIG. 1.

The proposed transmitter/driver structure of the present invention is presented in FIG. 1 (schematic diagram of transmitter and block diagrams of control circuit and switching circuits) and in FIG. 2 (logic schematic of the control circuit shown in FIG. 1).

The following abbreviations are used in FIG. 1:

VBAT is the power supply for the LIN transmitter.
V3V_DRIVER is internal 3V supply for the LIN transmitter.
GND _DRIVER is the ground for reference transmitter.
M0 is a NMOS4 transistor.
NMOS4 transistors have a large width to length ratio.
M1 through M4 are NDMOS65V transistors.
To achieve good EMI performance, operational switching of POWER_GATE must be done when POWER_GATE is lower than the threshold voltage of transistor M6. The output of the detector of transistor M0 is referred to as "VTHL" (lower than threshold). The threshold of an NDMOS transistor is about 0.86 volts, and the threshold of an NMOS transistor is about 0.68 volts.

In the design of the present invention, the ratio of transistors M1 to M5 is 1:1:1:1:1. The reference currents Iref2 through Iref5 are different, so that different current comparator operations can be performed. The ratio of transistors M1 to M5 is made the same for better layout matching.

In the schematic of FIG. 1, transistor M0 has a high W/L ratio of about thirty. Also in FIG. 1, Iref1=1.25 µA, Iref2=1.25 µA (to detect an Iload of 4 mA), Iref4=6.5 µA (to detect an (load of 20 mA), Iref5=9.4 µA (to detect an (load of 30 mA).

C1 is a capacitor having a value of about 85 pF.
C2 is a parasitic capacitor between the gate and drain of transistor M6 having a value of about 6 pF.
SW1 through SW6 are transistor switches.
Iref1 through Iref10 are reference current sources.
ENABLE is an enable signal for the transmitter.
VTH30M_DET is high when (load>30 mA.
VTH20M_DET is high when (load>20 mA.
VTH4M_DET is high when Iload>4 mA.
VTHL is high when POWER_GATE is higher than the threshold of transistor M0. (Transistor M0 is NMOS4 with large width, so the threshold of the VTHL is around threshold of transistor M0.)

The threshold voltage of the NMOS4 transistors (~0.68V) is lower than the threshold voltage of the NDMOS65V (~0.86V) transistors.

Referring now to FIG. 1, an LIN transmitter comprises a current mirror comprising a plurality of input transistors (M0, M1, M2, M3, M4, M5) for generating a first plurality of control signals (VTH30M_DET, VTH20M_DET, VTH4M_DET, and VTHL) and an output transistor (M6) coupled to a transmitter output node (LIN), a first plurality of current sources (Iref1, Iref2, Iref3, Iref4, Iref5) coupled to the plurality of input transistors, a second plurality of current sources (Iref6, Iref7, Iref8), a third plurality of current sources (Iref9, Iref10), a control circuit 102 for receiving the first plurality of control signals and for generating a second plurality of control signals (Fast_charge, start_curlim), and a third plurality of control signals (Fast_discharge, hard_switchoff), a first switching circuit 104 coupled to the second plurality of current sources for receiving the second plurality of control signals, and a second switching circuit 106 coupled to the third plurality of current sources for receiving the third plurality of control signals.

The VTH30M_DET signal comprises a first load current threshold control signal. The VTH20M_DET signal comprises a second load current threshold control signal. The VTH4M_DET signal comprises a third load current threshold control signal. The VTHL signal comprises a current mirror voltage threshold control signal.

The Fast_charge signal comprises a fast charge control signal. The start_curlim signal comprises a start current limit signal. The Fast_discharge signal comprises a fast discharge control signal. The hard_switchoff signal comprises a hard switchoff control signal.

The LIN transmitter 100 receives a transmit data input signal (TXD) and an enable signal (ENABLE).

The control circuit 102 comprises a plurality of D-type flip-flops and logic gates to provide the start current limit control signal, the fast charge control signal, the hard switchoff control signal, and the fast discharge control signal.

The first switching circuit 104 is gated by an inverted transmit data input signal (nTXD), the fast charge signal, and the start current limit signal, and is coupled to an input node (POWER GATE) of the current mirror. The first switching circuit includes reference currents Iref6, Iref7, Iref8, and corresponding switches. The switched currents provide the Icharge current as shown.

The second switching circuit 106 is gated by the transmit data input signal (TXD), the fast discharge signal, the hard switchoff signal, and is coupled between an input node of the current mirror (POWER GATE) and ground (GND_DRIVER). The second switching circuit includes reference currents Iref9 and Iref10, and corresponding switches. The switched currents provide the (discharge current as shown.

Referring now to FIG. 2, further details of the logic circuit 200 of transmitter 100 in FIG. 1 are shown.

A first portion 202 of the logic circuit 200 includes an inverter 206 for receiving the TXD signal and an AND gate 208 for receiving the ENABLE signal. A D-type flip-flop D1 has a D-input for receiving the V3V_DRIVER voltage, a CLK input for receiving the VTH20M_DET signal, a CLR input coupled to the output of gate 208, and a Q output for providing the start current limit signal. A D-type flip-flop D2 has a D-input for receiving the V3V_DRIVER voltage, a CLK input for receiving the VTHL_DET signal, a CLR input coupled to the output of gate 208, and a Q output. A NOR gate 210 has a first input coupled to the Q output of flip-flop D2, a second input for receiving the TXD signal, and an output for providing the fast charge signal.

The first portion 202 of the logic circuit 200 further includes an AND gate 212 for receiving the ENABLE and TXD signals. A D-type flip-flop D3 has a D-input for receiving the V3V_DRIVER voltage, a CLK input for receiving an inverted VTHL signal, a CLR input coupled to the output of gate 212, and a Q output. A D-type flip-flop D4 has a D-input for receiving the V3V_DRIVER voltage, a CLK input for receiving an inverted VTHL_DET signal, a CLR input coupled to the output of gate 212, and a Q output. An OR gate 216 has a first input coupled to the Q output of flip-flop D3, a second input for receiving the forced switchoff signal, and an output for providing the hard switchoff signal. A NOR gate 214 has a first input coupled to the Q output of flip-flop D4, a second input for receiving the TXD signal, and an output for providing the fast discharge signal.

A second portion 204 of the logic circuit 200 includes a delay element 218 having an input for receiving the TXD signal for providing about a nine microsecond delay, an inverter 220 coupled to an output of the delay element 218, and an AND gate 222 having a first input coupled to the output of inverter 220, a second input for receiving the TXD signal, and an output for providing a detect switchoff signal. The second portion of the logic circuit 200 also includes an OR gate 224 having a first input for receiving an inverter transmit signal nTXD, and a second input coupled to the output of gate 222. NOR gates 226 and 228 are cross-coupled, and have a first input coupled to the output of gate 224, and a second input for receiving the VTH4M_DET signal. AND gate 230 has a first input coupled to the output of gate 226, a second input for receiving the TXD signal, a third input for receiving the ENABLE signal, and an output for providing the forced switchoff signal.

Figure 3:
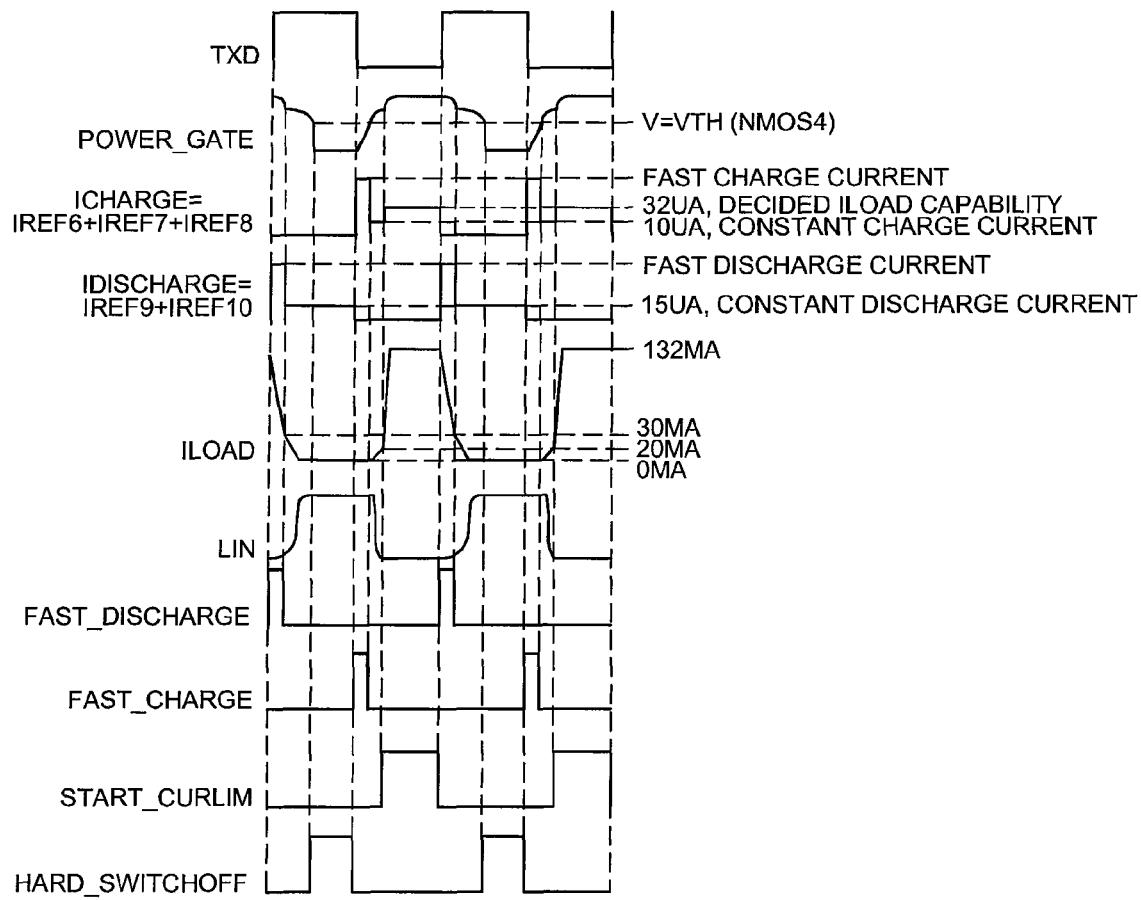
FIG. 3 is a timing diagram of various waveforms associated with the LIN transmitter of FIG. 1.

FIG. 3 shows the wave demonstration of control signal and key signals associated with the circuits of FIGS. 1 and 2.

With the current detections, the charge current and discharge current are divided to several segments, and timing is self-adjusted by detectors.

TXD is from 1=>0, POWER_GATE is rising from 0V,
1) When POWER_GATE is lower than threshold of nmos4 of M0 (now (load=0 mA), a big charge current is to charge POWER_GATE fast.
2) When POWER_GATE is higher than threshold of nmos4 of M0 and (load<20 mA, a small charge current is to shape falling edge of the LIN bus line.
3) When (load>20 mA, charge current increases to just satisfy current limitation.

TXD is from 0=>1, POWER_GATE is falling to 0V.
1) When 30 mA<Iload<132 mA, a big discharge current is to discharge POWER GATE fast.
2) When POWER_GATE is higher than threshold of nmos4 of M0 and (load<30 mA, a small charge current is to shape rising edge of the LIN bus line.
3) When POWER_GATE is lower than threshold of nmos4 of M0 (Iload=0 mA), a low-resistance switch will turn off POWER_GATE to ground.

In the logic control circuit 200, the detected signals are sent to D flip-flops to avoid noise interruption for cases of RF or ISO pulse injections. The load detections decide the value for (charge/(discharge, but never change the up or down direction of (charge/(discharge, and never turn on/off the (charge/(discharge. In implementation, the (charge current transitions from fast charge to slow charge and then to current limit, and never in the opposite direction. The (discharge current transition is similar, in that it proceeds from a fast discharge to a slow discharge, and then to a hard switchoff, and never in the opposite direction. The directionality of the transition is provided by logic control, and is important for immunity to interruptions. Only the TXD signal decides the on/off status for Icharge and (discharge. This method of operation is why the transmitter of the present invention is designated a "half-open-loop-controlled transmitter".

With the help of current segments, the ratio of output current mirror is not as large as that in an open loop structure. In an open-loop-controlled structure the ratio is equal to 9000:1 and current limitation is ~80 mA. In a half-open-controlled structure, the ratio=2200:1, and current limitation is not limited by size of power NDMOS anymore and set to be typically 132 mA.

When RF is injected to LIN_bus, the POWER_GATE becomes very noisy due to the RF signal. The outputs of the current detectors are triggered numerous times by the noise of the POWER_GATE node. With the inclusion of the D flip-flops, the first trigger will be recorded, and subsequent trigger signals will be ignored.

The effect of the parasitic capacitor between gate and drain of power NDMOS of M6 in RF injection and cases of TXD 0→1 and TXD 1→0 is now explained. Although the degraded mirror ratio (1:2200) also degrades the parasitic capacitor between gate and drain of power NDMOS, this is similar to the open-loop-controlled transmitter. In an open-loop structure the mirror ratio is 1:9000 or more.

1) When TXD goes from 1 to 0, POWER_GATE tends to be high to pull-down the LIN bus line, which tends to activate "Start_curlim" earlier and is good for RF immunity. It is theoretically better than open-loop-controlled structure and DAC-controlled structure, and simulation result supports the analysis.

2) When TXD goes from 0 to 1, two possibilities will happen.

The first possibility is that VTHL detector may be triggered earlier by the noise of coupled POWER_GATE, which is good for RF immunity.

Another possibility is that the half-open-loop-controlled transmitter may run into a switch-off problem as occurs in an open-loop-controlled transmitter. The POWER_GATE may stay at a stable level and never fall lower than threshold of M0 to switch off POWER_GATE, and a "Hard_switchoff" will never be triggered by (load. A new function named "forced switch-off function" is designed to solve the problem with the help of the load detector.

The circuit 204 for the "forced switch-off function" was previously described. The corresponding signal waveforms are shown in FIG. 4.

Figure 4:
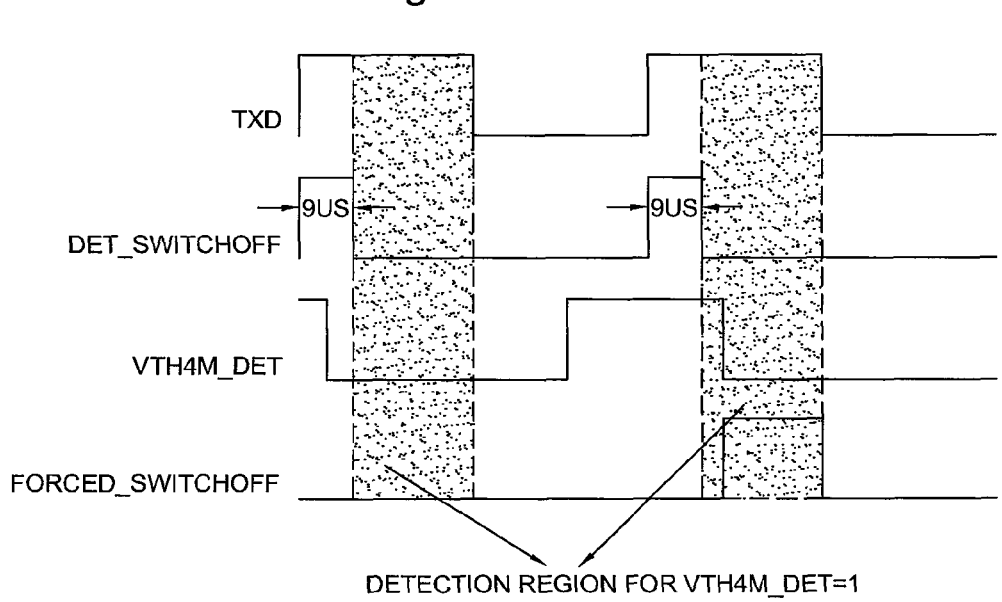
FIG. 4 is an additional timing diagram of various waveforms associated with the LIN transmitter of FIG. 1.

Referring now to FIG. 4, a window (det_switchoff) with typical width=9 us is to detect the value of Iload at 4 mA (Immunity of RF is required for a 12V-system. For Iload=4 mA in case of VBAT=12~14V, the LIN level is high enough to make the output of RX comparator to be high).

For un-interrupted cases of normal working and EMI test, the VTH4M_DET=1 is only detected inside the window and won't trigger the forced_switchoff. But in RF case, the POWER_GATE is charged to high; if the VTH4M_DET=1 (no matter shaking value or stable value) is detected outside the window the signal of "forced_switchoff" will be active from 0 to 1. To immunity shaking of "forced_switchoff" due to the RF interruption, a RS trigger is employed.

As shown in FIG. 2, the signal of "force_switchoff" is OR operated with detector of "VTHL" to turn off power NDMOS. With the use of the "forced switch-off function", the trade-off between RF immunity and EMI performance does not exist anymore.

In normal operational mode, without any external interruption, the detector of VTHL jumps from high to low when POWER_GATE is discharged down lower than the threshold of transistor M0. With a D flip-flop, a logic signal is provided, which is the hard-switchoff signal during normal operational conditions. With RF injection, however, the POWER_GATE node may assume a DC level. If the POWER_GATE stays at a level higher than the threshold voltage of transistor M0, the hard switch off may never happen and circuit failure will result.

The external pull-up resistor 124 is fixed at one kilohm and VBAT is typically set to twelve volts, with a range of 10-14 volts. The threshold of the LIN receiver is 0.45*VBAT to 0.55*VBAT. If the LIN-bus is higher than 0.55*VBAT, the Iload of transistor M6 should be lower than 4 mA. With some matching of the current reference and the capacitor value, the time band matching can be set to the discharging time. In FIG. 4, the time is set to 9 μs, which is a typical value.

The half-open-loop-controlled transmitter also has good immunity to positive coupling of ISO2a and ISO3a (ISO3a is a negative pulse. Because it has too fast falling edge (<5 ns), LIN cannot response with coupling of falling edge of ISO3a but can response to rising edge of ISO3a).

When LIN bus line is coupled with a positive high peak, the gate of power NDMOS is coupled highly via parasitic capacitor between gate and drain of power NDMOS and signal of "start_curlim" is triggered to pull down LIN bus line rapidly. Then output of receiver of LIN will not be error triggered to high level pulses by the high coupled pulses.

According to the present invention, a new structure of an LIN transmitter has both good EMI characteristics and good immunity to RF. It also has good immunity to ISO2a and ISO3a.

The LIN transmitter of the present invention has all merits of the prior art but does not show any of the trade-offs or drawbacks of the prior art transmitters. The circuit design of the present invention is simple and easy to control.

It will be apparent to those skilled in the art, therefore, that various modifications and variations can be made to the invention without departing from the spirit or scope of the invention. Thus, it is intended that the present invention covers the modifications and variations of this invention provided they come within the scope of the appended claims and their equivalents.

I claim:

1. An LIN transmitter comprising:
   a current mirror comprising a plurality of input transistors for generating a first plurality of control signals and an output transistor coupled to a transmitter output node;
   a first plurality of current sources coupled to the plurality of input transistors;
   a second plurality of current sources;
   a third plurality of current sources;
   a control circuit for receiving the first plurality of control signals and for generating a second plurality of control signals and a third plurality of control signals;
   a first switching circuit coupled to the second plurality of current sources for receiving the second plurality of control signals; and
   a second switching circuit coupled to the third plurality of current sources for receiving the third plurality of control signals.

2. The LIN transmitter of claim 1 wherein the first plurality of control signals comprises a first load current threshold control signal.

3. The LIN transmitter of claim 2 wherein the first plurality of control signals comprises a second load current threshold control signal.

4. The LIN transmitter of claim 3 wherein the first plurality of control signals comprises a third load current threshold control signal.

5. The LIN transmitter of claim 1 wherein the first plurality of control signals comprises a current mirror voltage threshold control signal.

6. The LIN transmitter of claim 1 wherein the second plurality of control signals comprises a fast charge control signal.

7. The LIN transmitter of claim 1 wherein the second plurality of control signals comprises a start current limit control signal.

8. The LIN transmitter of claim 1 wherein the third plurality of control signals comprises a fast discharge control signal.

9. The LIN transmitter of claim 1 wherein the third plurality of control signals comprises a hard switchoff control signal.

10. The LIN transmitter of claim 1 wherein the control circuit receives a transmit data input signal.

11. The LIN transmitter of claim 1 wherein the control circuit receives an enable signal.

12. The LIN transmitter of claim 1 wherein the control circuit comprises a plurality of D-type flip-flops and logic gates to provide a start current limit control signal and a fast charge control signal.

13. The LIN transmitter of claim 1 wherein the control circuit comprises a plurality of D-type flip-flops and logic gates to provide a hard switchoff control signal and a fast discharge control signal.

14. The LIN transmitter of claim 1 wherein the first switching circuit is gated by a transmit data input signal.

15. The LIN transmitter of claim 1 wherein the first switching circuit is coupled to an input node of the current mirror.

16. The LIN transmitter of claim 1 wherein the second switching circuit is gated by a transmit data input signal.

17. The LIN transmitter of claim 1 wherein the second switching circuit is coupled to an input node of the current mirror.

18. The LIN transmitter of claim 1 further comprising a capacitor coupled between an input node of the current mirror and ground.

19. An LIN transmitter comprising:
a current mirror comprising a plurality of input transistors for generating a first plurality of control signals and an output transistor coupled to a transmitter output node;
a plurality of current sources coupled to the plurality of input transistors;
a control circuit for receiving the first plurality of control signals and for generating a second plurality of control signals; and
a switching circuit coupled to the current mirror for receiving the second plurality of control signals.

* * * * *